(No Model.)
R. B. BROWN.
WATER REGULATOR FOR BOILERS.
No. 407,991. Patented July 30, 1889.
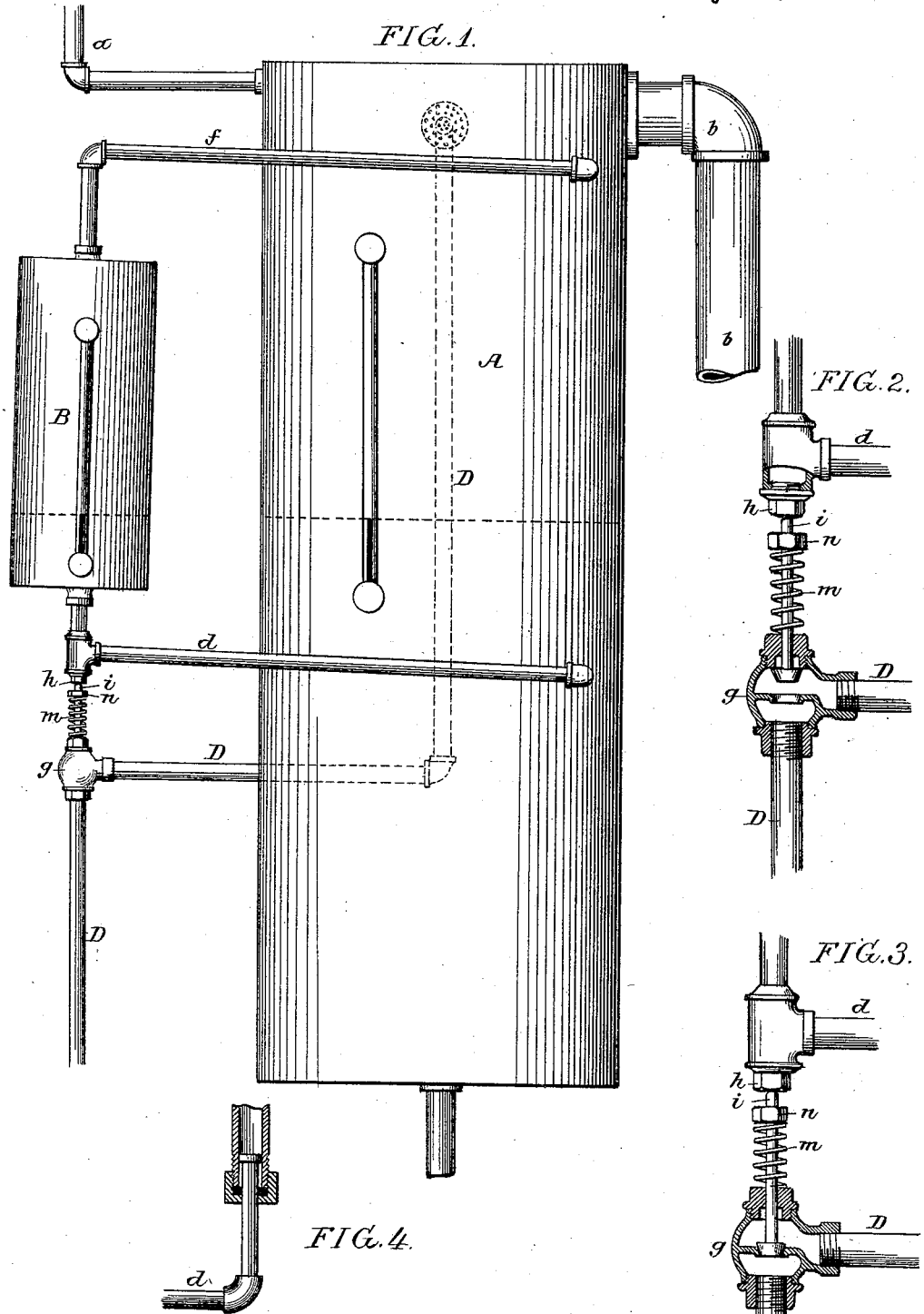
Witnesses:
John Wilson
William D. Conner.
Inventor:
Richard B. Brown
by his Attorneys
Howson & Howson

UNITED STATES PATENT OFFICE.

RICHARD B. BROWN, OF PHILADELPHIA, PENNSYLVANIA.

WATER-REGULATOR FOR BOILERS.

SPECIFICATION forming part of Letters Patent No. 407,991, dated July 30, 1889.

Application filed April 19, 1889. Serial No. 307,681. (No model.)

*To all whom it may concern:*

Be it known that I, RICHARD B. BROWN, a citizen of the United States, and a resident of Philadelphia, Pennsylvania, have invented certain Improvements in Water-Level Regulators for Reservoirs, Steam-Boilers, &c., of which the following is a specification.

One object of my invention is to provide means for maintaining a uniform or substantially uniform level of liquid in a vacuum-tank, some of the features of the invention being also applicable to steam-boilers, open feed-tanks, and like vessels in which a uniform or substantially uniform level of liquid is desirable.

In the accompanying drawings, Figure 1 is a side view of a vacuum feed-water tank provided with the attachment forming the subject of my invention, and Figs. 2, 3, and 4 are enlarged views of parts of said attachment.

A represents the tank or reservoir, which receives water of condensation from the general return-pipe $a$, which communicates with a system of steam-heating coils or radiators of a building, the tank having also a pipe $b$, through which the upper portion of the tank may be placed in communication with an air-pump or other exhausting device, whereby a partial vacuum may be maintained in the tank for the purpose of inducing a rapid circulation of steam through the coils or radiators of the heating system.

At one side of the tank or reservoir A is a vessel B, which is in communication with said tank at a point below the normal level of water in the same through a pipe $d$ and at a point above the normal water-level through a pipe $f$, both of these pipes having, by preference, swinging or pivotal connections with the tank A, as shown in Fig. 4, so that the vessel B is free to rise and fall under the circumstances described hereinafter, although if the pipes $d$ and $f$ are comparatively long the spring of the pipes may be sufficient to permit the desired rise and fall of said vessel B. The water-supply pipe D communicates with the upper portion of the tank A, and this pipe has a valve $g$ opening upward by pressure from below, the stem $i$ of this valve projecting through the top of the valve-casing and into contact with a plug $h$, carried by a T-joint forming part of the fitting between the pipe $d$ and the vessel B.

The vessel B may be suspended from the stem of the valve instead of resting upon it, the support in either case being direct and positive, so that the entire weight of the vessel and its contents is borne by the valve without loss due to the friction of the intermediate parts.

Owing to the connections $d$ and $f$ between the tank A and vessel B, the level of water in the latter is always the same as that in the tank A, and when the water is at its normal level the weight of water in the vessel B is sufficient to overcome the upward pressure upon the valve $g$, and thus hold the latter firmly to its seat, so as to prevent the inflow of any feed-water through the pipe D into the tank A. If, however, the level of water in the tank A and vessel B falls below the normal level, the weight of said vessel B and its load is lightened to such an extent that it fails to overcome the pressure tending to lift the valve $g$; hence the latter is opened and feed-water enters the tank A through the pipe D until the normal level in the latter and in the vessel B is restored, whereupon the weight of the vessel B and its load again preponderates, thus closing the valve $g$ and cutting off the flow of water through the pipe D.

Where the pressure of water tending to open the valve $g$ is light it may be advisable to re-enforce the lifting action of the same by means of a spring $m$, interposed between a bearing on the top of the valve-casing and a nut $n$ on the lower valve-stem $i$, the stem being threaded and the nut being adjustable thereon, so as to vary the tension of the spring $m$ as desired.

In the event of the application of my improved regulating device to a steam-boiler the the valve $g$ may control the flow of water under pressure to the boiler, or may be used to control the admission of steam to the feed-pump or injector whereby the boiler is supplied.

In vacuum-tanks such as I have illustrated the ordinary form of internal valve-controlling float is of no avail; hence I use the external gravitating vessel, whereby the valve in the inlet-pipe is operated, so as to control the flow of liquid into the main tank.

I am aware that gravitating vessels have been employed in steam-traps so as to act through the medium of a system of levers upon the valve which admits steam to the reservoir of the trap; but in my regulator the weight of the gravitating vessel is supported directly by the valve without the intervention of any levers, and in the preferred form of the device such valve is directly in the water-supply pipe.

Having thus described my invention, I claim and desire to secure by Letters Patent—

1. The combination of a tank or reservoir and an external gravitating vessel having a swinging pipe-connection with said tank or reservoir above and below the normal water-level therein, and a feed-controlling valve closing against the pressure and having a projecting stem supporting the regulating-vessel and its load, substantially as specified.

2. The combination of the tank or reservoir and the external gravitating vessel having a swinging pipe-connection with said tank or reservoir above and below the normal level of water therein, a pipe for supplying the tank with water under pressure, and a valve closing against the pressure in said pipe and having a projecting stem which supports the gravitating vessel and its load, substantially as specified.

3. The combination of the tank or reservoir, the external gravitating vessel having a swinging pipe-connection with said tank above and below the normal water-level of the same, a feed-pipe having a valve closing against the pressure in said pipe and having a projecting stem supporting said regulating-vessel, and a spring acting on said stem to aid in the support of the regulating-vessel, substantially as specified.

4. The combination of the tank, a vacuum-pipe communicating with the upper portion of the tank, an external gravitating vessel having a swinging pipe-connection with the tank above and below the normal level of liquid therein, and a supply-pipe communicating with the tank and having a valve closing against the pressure in the pipe, and having a projecting stem for supporting said external gravitating vessel, substantially as specified.

5. The combination of the tank, a pipe for returning water of condensation thereto, a vacuum-pipe communicating with the upper portion of the tank, an external gravitating vessel having a swinging pipe-connection with the tank above and below the normal level of water therein, and a water-supply pipe having a valve controlled by the rise and fall of the external gravitating vessel, substantially as set forth.

In testimony whereof I have signed my name to this specification in the presence of two subscribing witnesses.

RICHARD B. BROWN.

Witnesses:
JAMES O. BARR,
HENRY H. COLLINS.